United States Patent
De Barros et al.

(10) Patent No.: US 8,972,435 B2
(45) Date of Patent: Mar. 3, 2015

(54) AUTOMATIC GENERATION OF SEMANTICALLY SIMILAR QUERIES

(71) Applicant: Microsoft Corporation, Redmond, WA (US)

(72) Inventors: Marcelo De Barros, Redmond, WA (US); Manish Mittal, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 89 days.

(21) Appl. No.: 13/715,614

(22) Filed: Dec. 14, 2012

(65) Prior Publication Data

US 2014/0172900 A1    Jun. 19, 2014

(51) Int. Cl.
G06F 7/00 (2006.01)
G06F 17/30 (2006.01)

(52) U.S. Cl.
CPC .................. *G06F 17/3064* (2013.01)
USPC ........... 707/765; 707/766; 707/767; 707/768; 707/769

(58) Field of Classification Search
CPC .......... G06F 17/30424; G06F 17/3064; G06F 17/30643; G06F 17/30657; G06F 17/30672; G06F 17/3097; G06F 17/30929; G06F 17/30964; G06F 17/30979
USPC .................. 707/759, 765, 766, 767, 768, 769
See application file for complete search history.

(56) References Cited

U.S. PATENT DOCUMENTS

| | | | |
|---|---|---|---|
| 5,940,821 A * | 8/1999 | Wical | 1/1 |
| 6,006,225 A | 12/1999 | Bowman et al. | |
| 7,260,568 B2 | 8/2007 | Zhang et al. | |
| 7,552,112 B2 | 6/2009 | Jhala et al. | |
| 7,814,086 B2 | 10/2010 | Bartz et al. | |
| 8,055,669 B1 | 11/2011 | Singhal et al. | |
| 8,180,754 B1 | 5/2012 | Ershov | |
| 2008/0104045 A1 | 5/2008 | Cohen et al. | |
| 2008/0201324 A1 * | 8/2008 | Aronowich et al. | 707/5 |
| 2010/0268712 A1 * | 10/2010 | Ngwije | 707/737 |
| 2012/0130978 A1 * | 5/2012 | Li et al. | 707/706 |

OTHER PUBLICATIONS

Cucerzan, et al., "Extracting Semantically Related Queries by Exploiting User Session Information", In Technical Report, Microsoft Research, Apr. 1, 2011, 11 pages.

* cited by examiner

*Primary Examiner* — Hares Jami
(74) *Attorney, Agent, or Firm* — Dave Ream; Doug Barker; Micky Minhas

(57) ABSTRACT

Query suggestions are generated based on a Breadth-First-Search having a configurable decaying radius. A computer system receives an initial set of semantically similar queries. The computer system expands the set to include related terms. The set of related terms is included in the initial set. The expansion process is repeated for each query or related term in the set. The radius may be reduced for each subsequent related term added to the query. The process may stop when the radius reaches a specified threshold, e.g., a predetermined number of queries or terms for the set is reached. The set includes the related terms and search queries. The set may be used for, among other things, suggesting related terms to a researcher, improving search engine performance, or selecting appropriate advertisements.

21 Claims, 5 Drawing Sheets

AUTOMATIC GENERATION OF SEMANTICALLY SIMILAR QUERIES

BACKGROUND

Keyword or query searching of large document collections, such as documents available on a network, is now a common activity. As search engines have become more readily available, the number of users of search technology has increased, and these users search an increasing range of topics. As a result, many searches are conducted by users in topic areas that the user is unfamiliar with. This can lead to difficulties for the user in formulating a search query.

Conventional search engines execute sophisticated technologies to identify related queries for a given query. These related queries may be surfaced to the user during query formulation (e.g., as the user enters query in a search box). Some conventional search engines may filter the related queries based on a user's location, cookie information, the type of browser, and other contextual data. Accordingly, the conventional engines provide limited assistance when a user is formulating a given query.

SUMMARY

In various embodiments, an initial set of queries is expanded using a breadth-first search. The expanded set of queries may aid in selection of search results or selection of advertisements that are displayed in a search engine results page. The search engine may provide the expanded set to a researcher that is seeking query formulation assistance.

Related terms are generated by a computing system for inclusion in an expanded set. The related terms are semantically similar to the initial set of queries. In some embodiments, the computing system utilizes a decaying radius to manage a number of terms that are selected for inclusion in the expanded set. The expansion process is executed first on the initial set of queries. In turn, the expansion process is also executed on some of the terms included in the expanded set of queries. The expansion process stops when a threshold is reached. The threshold may be the number of queries in the expansion set or the size of radius.

This Summary is provided to introduce a selection of concepts in a simplified form that are further described below in the Detailed Description. This Summary is not intended to identify key features or essential features of the claimed subject matter, nor is it intended to be used as an aid, in isolation, in determining the scope of the claimed subject matter.

BRIEF DESCRIPTION OF THE DRAWINGS

Embodiments of the invention are described in detail below with reference to the attached drawing figures, wherein.

DETAILED DESCRIPTION

Figure 1:
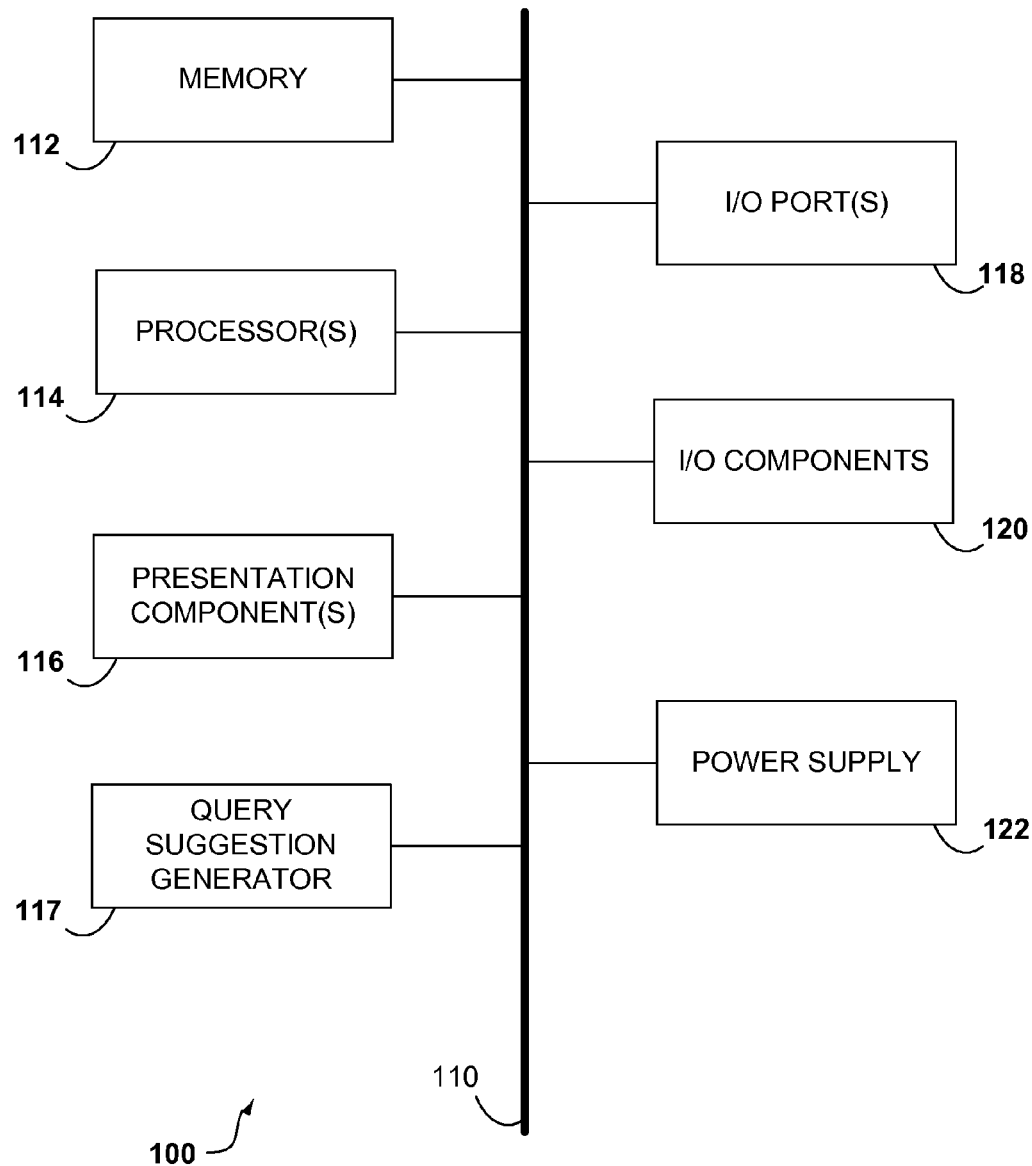
FIG. 1 is a block diagram of an exemplary computing environment suitable for use in implementing embodiments of the invention.

The subject matter of this patent is described with specificity herein to meet statutory requirements. However, the description itself is not intended to necessarily limit the scope of the claims. Rather, the claimed subject matter might be embodied in other ways to include different steps or combinations of steps similar to the ones described in this document, in conjunction with other present or future technologies. Although the terms "step," "block," and/or "component," etc., might be used herein to connote different components of methods or systems employed, the terms should not be interpreted as implying any particular order among or between various steps herein disclosed unless and except when the order of individual steps is explicitly described.

Systems and methods are provided for generating related terms. The computer system may receive an initial set of terms. In some embodiments, the terms of the initial set are semantically related. The semantically related terms may be queries. The computing system may iteratively select terms from the set and obtain suggestions for related terms. The computing system may iterate over the initial set of terms and any related terms that are identified as related to one or more terms in the initial set. The computing system may stop the iterations when an appropriate threshold is met. The suggestions for related terms may be received from a search engine. For instance, a query suggestion component of the search engine may provide a set of related terms. The query suggestions component, in certain embodiments, provides suggestions that are semantically related to a term received from the search engine.

In one embodiment, the computing system may assign a radius to the terms included in the initial set. The radius may be configured by a user that is using the computer system. In turn, for the terms added to the initial set from the suggestions, the computing system may assign a reduced radius. The reduced radius may be the initial radius reduced by a predetermined amount. The predetermined amount may also be configured by the user. In certain embodiments, the radius is decremented by one.

The computing system may continue to obtain suggestions until either the radius is reduced to a specified size or the number of terms added to the initial set reaches a specified number. After the computer has reached the threshold, the list of related terms is finalized by removing duplicates. In turn, the list may be provided as an expanded set of terms related to the initial set.

In one embodiment, the computing system obtains an initial set S of semantically similar queries. In turn, the computing system produces a much larger set S' (S is a subset of S') such that S' contains semantically similar queries to S. In some embodiments, the computing system creates permutations of the initial queries in S. These permutations may be included in the initial set and may be used to maximize the set of related queries S'. The related terms are obtained from a search engine suggestion component and included in the set S'. In one embodiment, the computing system selects the related terms that belong to S' based on a proximity to the existing queries in S. The proximity is based on a decay model that reduces a weight (e.g., radius of the queries.) In some embodiments, a weighted Breadth-First-Search (BFS) may be used to navigate thru S and to create S'.

Accordingly, the computing system may use the related terms to enhance training data for verticals, people, local, auto, movies, that are searched frequently. The computing system may expand the set of training data using the expansion process. The expanded training data may be used to provide better suggestions or better autocompletions when a user searches one of the verticals.

In other embodiments, the related terms provided may be cached with corresponding popular queries by the computing system. For instance, 100K popular queries may be processed by the computing system to obtain related terms. These related terms may be stored in a cache to improve performance when selecting advertisements, selecting search results, or providing suggestions. By pre-caching the semantically similar queries for the popular queries, the computing system may provide suggestions or results quicker.

In yet another embodiment, the computing system may expose an API to a user researching a topic. The user may desire a certain number of related terms for an initial set of semantically similar queries. The initial set may be formulated by the user. The user may provide the set of semantically similar queries to the computing system. The user may also include the desired number of terms. The computing system may expand the set of semantically similar queries to include related terms. The expanded set may be returned to the user.

Having briefly described an overview of embodiments of the invention and some of the features therein, an exemplary operating environment suitable for implementing the present invention is described below.

FIG. 1 schematically shows a system environment suitable for performing embodiments of the invention. Referring to the drawings in general, and initially to FIG. 1 in particular, an exemplary operating environment for implementing embodiments of the invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The embodiments of the invention may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks or implements particular abstract data types. Embodiments of the present invention may be practiced in a variety of system configurations, including handheld devices, tablet computers, consumer electronics, general-purpose computers, specialty computing devices, etc. Embodiments of the invention may also be practiced in distributed computing environments where tasks are performed by remote-processing devices that are linked through a cloud-based platform or communications network.

As one skilled in the art will appreciate, the computing device 100 may include hardware, firmware, software, or a combination of hardware and software. The hardware includes processors and memories configured to execute instructions stored in the memories. The logic associated with the instructions may be implemented, in whole or in part, directly in hardware logic. For example, and without limitation, illustrative types of hardware logic include field programmable gate array (FPGA), application specific integrated circuit (ASIC), system-on-a-chip (SOC), or complex programmable logic devices (CPLDs). The hardware logic allows the computing system to generate related terms that are semantically similar to an initial set of queries. The initial set of queries is expanded to include the related terms. The computer device 100 may have a query suggestion generator 117, which, in some embodiments, provides the related terms based on the queries included in the initial set.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear and, metaphorically, the lines would more accurately be grey and fuzzy. For example, one may consider a presentation component such as a display device to be an I/O component. Also, processors have memory. The inventors hereof recognize that such is the nature of the art and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computer" or "computing device."

The query suggestion generator 117, according to an embodiment of the invention, provides related terms. In some embodiments, the query suggestion generator 117 may execute logic similar to a query completion component or query suggestion component. The query suggestion generator 117 may execute a decay model to limit the number of terms included in the related set. The query suggestion generator 117, in certain embodiments, may receive a configurable radius that is used to implement the decay model.

Computing device 100 typically includes a variety of computer-readable media. Computer-readable media can be any available media that can be accessed by computing device 100 and includes both volatile and nonvolatile media, removable and non-removable media. Computer-readable media may comprise computer storage media and communication media.

Computer storage media includes volatile and nonvolatile, removable and non-removable media implemented in any method or technology for storage of information such as computer-readable instructions, data structures, program modules or other data. Computer storage media includes, but is not limited to, Random Access Memory (RAM), Read Only Memory (ROM), Electronically Erasable Programmable Read Only Memory (EEPROM), flash memory or other memory technology, CD-ROM, digital versatile disks (DVD) or other holographic memory, magnetic cassettes, magnetic tape, magnetic disk storage or other magnetic storage devices, or any other medium that can be used to encode desired data and that can be accessed by the computing device 100. In an embodiment, the computer storage media can be selected from tangible computer storage media like flash memory. In an embodiment, the computer storage media can be selected from tangible computer storage media. These memory technologies can store data momentarily, temporarily, or permanently.

On the other hand, communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components 116 include a display device, speaker, printing component, vibrating component, etc. I/O ports 118 allow computing device 100 to be logically coupled to other devices including I/O components 120, some of which may be built in. Illustrative I/O components include a microphone, joystick, game pad, satellite dish, scanner, printer, wireless device, a controller, such as, a stylus, a keyboard and a mouse, or a natural user interface (NUI), etc. The NUI includes air gestures, voice, or other physiological inputs generated by a user. These inputs may be interpreted as queries that should be included in an initial set by the computing device 100. These requests may be transmitted to the appropriate network element for further processing. The NUI implements any combination of speech recognition, touch and stylus recognition, facial recognition, biometric recognition, gesture recognition both on screen and adjacent to the screen, air gestures, head and eye tracking, and touch recognition associated with displays on the computing device 100. The computing device 100 may be equipped with depth cameras, such as, stereoscopic camera systems, infrared camera systems, RGB camera systems, and combinations of these for gesture detection and recognition. Additionally, the computing device 100 may be equipped with accelerometers or gyroscopes that enable detection of motion. The output of the accelerometers or gyroscopes is provided to the display of the computing device 100 to render immersive augmented reality or virtual reality.

Various aspects of the technology described herein are generally employed in computer systems, computer-implemented methods, and computer-readable storage media for, among other things, expanding an initial set of semantically similar queries. The related terms are identified by a suggestion component. The computing device 100 may execute a Breadth-First-Search (BFS), in one embodiment, to add the suggested related terms to the initial set until a threshold is reached. The threshold may be a predetermined number limit for the size of the semantically related terms or a limit on the radius size associated with the BFS. In some embodiments, the predetermined number limit and the predetermined radius size are established by a user of the computing device 100.

In one embodiment, a computing system may include a search engine, a query suggestions engine, and an expansion engine. The search engine may be configured to receive user queries and generate search results. In some embodiments, the search engine may also be configured to obtain an initial set of queries from the user and to provide an expanded set that includes the initial set of queries and other related terms to the user. The related terms included in the expanded set may be obtained from a query suggestions engine. The query suggestion engine receives a term and provides a list of related terms. The query suggestion engine may receive the term from the initial set of queries provided to the search engine. In one embodiment, the query suggestion engine may receive the initial set from the expansion engine. The related terms may be semantically related to the term received by the query suggestions engine. The expansion engine executes the BFS on the related terms to identify the terms that should be included in the expanded set.

Figure 2:
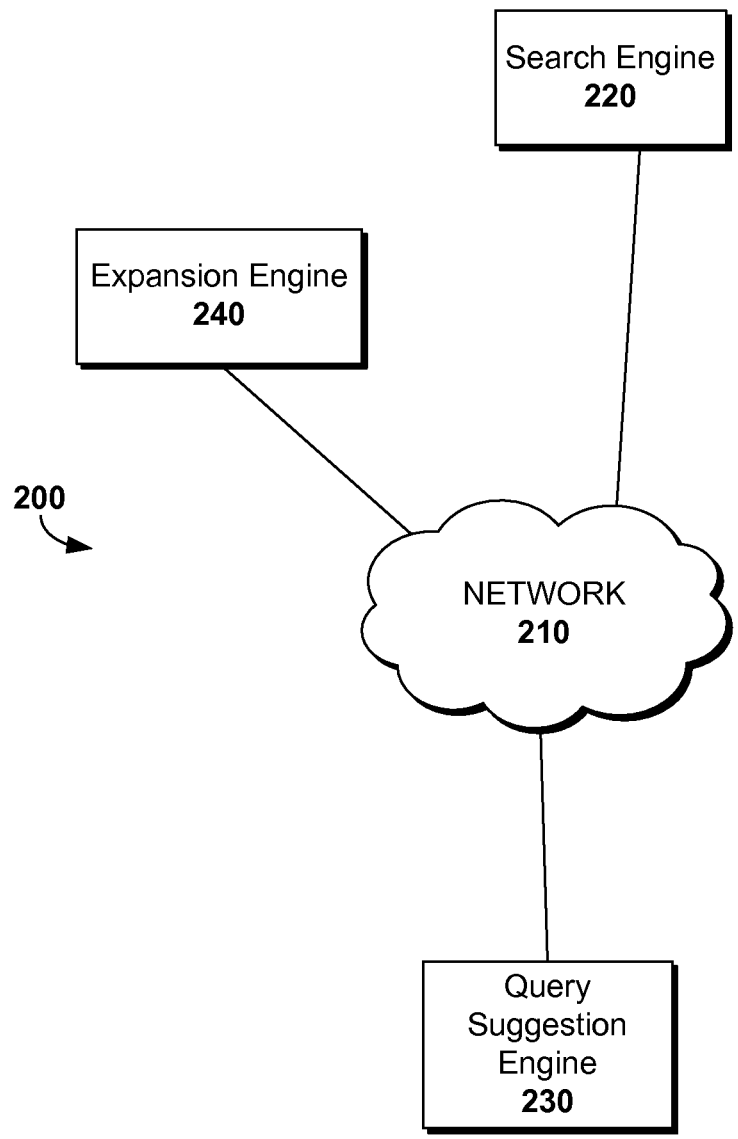
FIG. 2 schematically shows a system suitable for performing various embodiments of the invention.

FIG. 2 schematically shows a system suitable for performing various embodiments of the invention. Embodiments of the invention relate to systems and methods for generating search query suggestions. Turning now to FIG. 2, a block diagram is illustrated, in accordance with an embodiment of the present invention, showing an exemplary computing system 200. It will be understood and appreciated by those of ordinary skill in the art that the computing system 200 shown in FIG. 2 is merely an example of one suitable computing system environment and is not intended to suggest any limitation as to the scope of use or functionality of embodiments of the present invention. Neither should the computing system 200 be interpreted as having any dependency or requirement related to any single component or combination of components illustrated therein. Further, the computing system 200 may be provided as a stand-alone product, as part of a software development environment, or any combination thereof.

The computing system 200 includes a network 210, a search engine 220, a query suggestion engine 230, and an expansion engine 240. The network 210 communicatively connects the search engine 220, the query suggestion engine 230, and the expansion engine 240. While the search engine 220, the query suggestion engine 230, and the expansion engine 240 are illustrated as separate elements in FIG. 2, one or more of these elements can be combined in some embodiments. The network may include, without limitation, one or more local area networks (LANs) and/or wide area networks (WANs). Such networking environments are commonplace in offices, enterprise-wide computer networks, intranets and the Internet.

Search engine 220 can be any suitable search engine for receiving a search query, receiving an initial list of semantically related queries, and generating a list of matching documents to return as results. The search engine 220 may receive an expanded list having the initial list of semantically related queries and other related terms from an expansion engine. In some embodiments, the search engine 220 may provide the expanded list to the user. In other embodiments, the expanded list may be cached to improve the performance of the search engine 220. In some embodiments, the search engine 220 may obtain expansion configuration data, like desired number of terms, BFS radius, radius reduction amount, etc.

Query suggestion engine 230 can provide query suggestions based on an input query. Query suggestion engine 230 may generate a suggested query by any convenient method, such as adding additional terms or adding and/or replacing terms based on similarity to existing query terms. Query suggestion engine 230 may provide related terms that are semantically similar to the input query or queries.

Expansion engine 240 is configured to perform a breadth first search for the initial set of semantically similar queries. The expansion engine 240 obtains a radius for each of the queries included in the initial set. In one embodiment, the radius is provided by the user. The expansion engine 240 may receive both the radius and the initial set of semantically similar queries from the search engine 220. In some embodiments, the expansion engine 240 may create one or more permutations from the queries included in the initial set of semantically similar queries. The permutations may combine one or more of the queries with each other. For each permutation created, a combination radius is specified by the expansion engine. In one embodiment, the combined radius is the radius of the initial set of semantically similar queries divided by the number of queries combined.

The expansion engine 240 may request that the query suggestion engine 230 provide a list of suggestions that include related terms for one or more queries in the initial set of semantically similar queries. The expansion engine 240 may receive the related terms from the query suggestion engine 230 and may reduce the radius by a predetermined amount. In turn, the related terms and reduced radius are added to the initial set. The expansion engine 240 repeats this expansion process until the radius reaches a predetermined threshold (e.g., the number of terms including the initial queries and the related terms satisfies a number of terms desired by a user of the search engine.)

Accordingly, the computing system provides an expanded set of terms based on an initial set of semantically similar queries. The expansion engine executes a breadth first search to narrow the number of terms identified as related by the query suggestion engine. The expanded terms are used to improve search performance and query assistance provided by a search engine.

In one embodiment, a researcher may request query assistance from a computing system. The research may have a list of queries that are semantically similar. The researcher may provide the list to the computing system. The computing system expands the list to include related terms. The computing system may provide the expanded list to the user.

Figure 3:
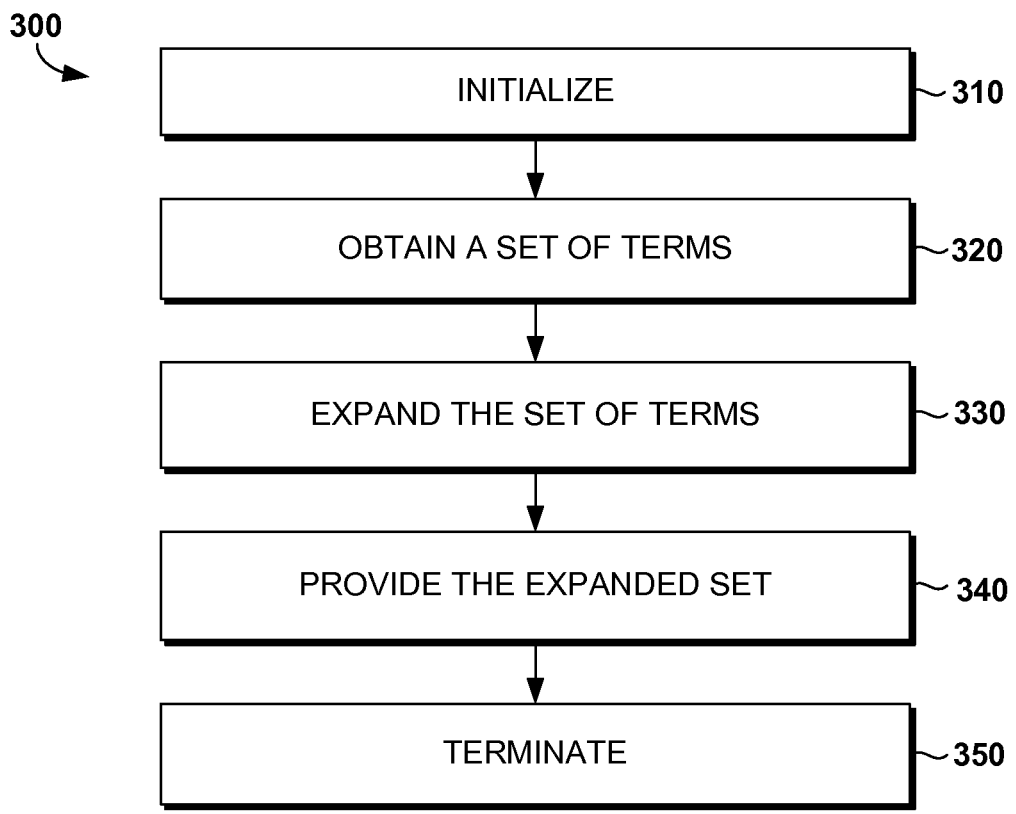
FIG. 3 depicts a logic diagram for an exemplary method for assisting a user with a search request, according to an embodiment of the invention.

FIG. 3 depicts a logic diagram for an exemplary method for assisting a user with a search request, according to an embodiment of the invention. The method initializes in step 310. The computing system, in step 320, obtains a set of research terms from a user. The user may also specify a number of related terms desired. In turn, the computing system expands the set of research terms, in step 330. To expand the set of research terms, the computer system assigns a radius to each research term. The radius is utilized during a breadth first search executed by the computing system.

The computing system may be configured to perform the following for each research term until a predetermined threshold is satisfied. In one embodiment, the threshold is a radius size. In another embodiment, the threshold is a number of related terms desired by the user.

The computing system obtains a set of terms related to the research term. The radius is reduced by a predetermined amount by the computing system. The related terms are assigned the reduced radius. The computing system includes the related terms and the reduced radius corresponding to the related terms to the set of terms. In step 340, the computing system provides the set of terms to the user. The method terminates in step 350.

In other embodiments, the search engine performance may improve based on the computing system's ability to cache popular queries. The popular queries and related terms are cached together. In turn, subsequent requests matching a popular query may be expanded to include the related terms. The expanded terms allow the search engine to provide a user with relevant search results or advertisements. The search results or advertisements may correspond to the terms related to the popular queries.

Figure 4:
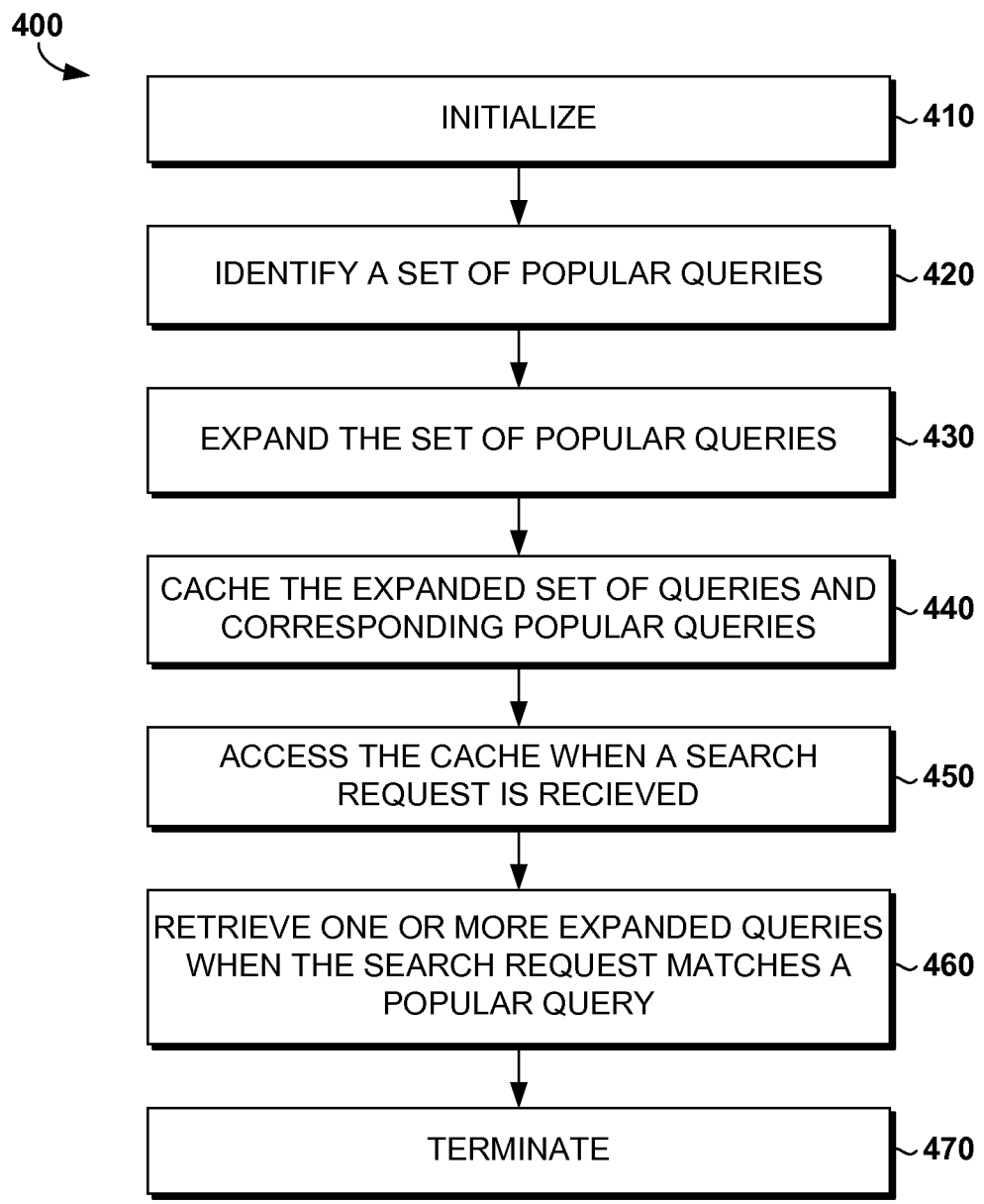
FIG. 4 depicts a logic diagram for an exemplary method for caching related queries, according to an embodiment of the invention.

FIG. 4 depicts a logic diagram for an exemplary method for caching related queries, according to an embodiment of the invention. The method initializes at step 410. In step 420, the computing system identifies a set of popular queries received by the search engine. The popular queries may be identified from a query log based on frequency. The computing system, in step 430, expands each of the popular queries.

The computer system executes an expansion engine that expands each of the popular queries. The expansion engine assigns a radius to each of the popular queries. For each popular query, the expansion engine performs the following until a predetermined threshold is satisfied. In one embodiment, the predetermined threshold is a radius size. In an alternative embodiment, the threshold is a combined number of popular queries and related terms. The expansion engine obtains a set of terms related to the popular query. The radius is reduced by a predetermined amount. The expansion engine assigns the related terms the reduced radius. The related terms and the reduced radius corresponding to the related terms are added to the expanded queries by the expansion engine.

In turn, the expanded set of queries and the corresponding popular queries are stored in a cache by the computing system, in step 440. When a search engine receives a search request, the cache is accessed by the computing system in step 450 to check the stored popular queries and related terms. In step 460, the computing system retrieves one or more of the expanded queries from the cache when the search request matches a popular query or one of the related terms. The computing system may retrieve search results based on the popular queries and the one or more expanded queries. The method terminates in step 470.

In still another embodiment, the related terms are produced by a query suggestion or query completion component. The related terms are selected by the query suggestion or query completion component based on an initial set of semantically similar queries. An expansion algorithm that implements a breadth first search is executed by the computing system to expand the initial set of semantically similar queries. These related terms are used to aid the search engine when selecting search results or advertisements for one or more of the queries in the initial set of semantically similar queries.

Figure 5:
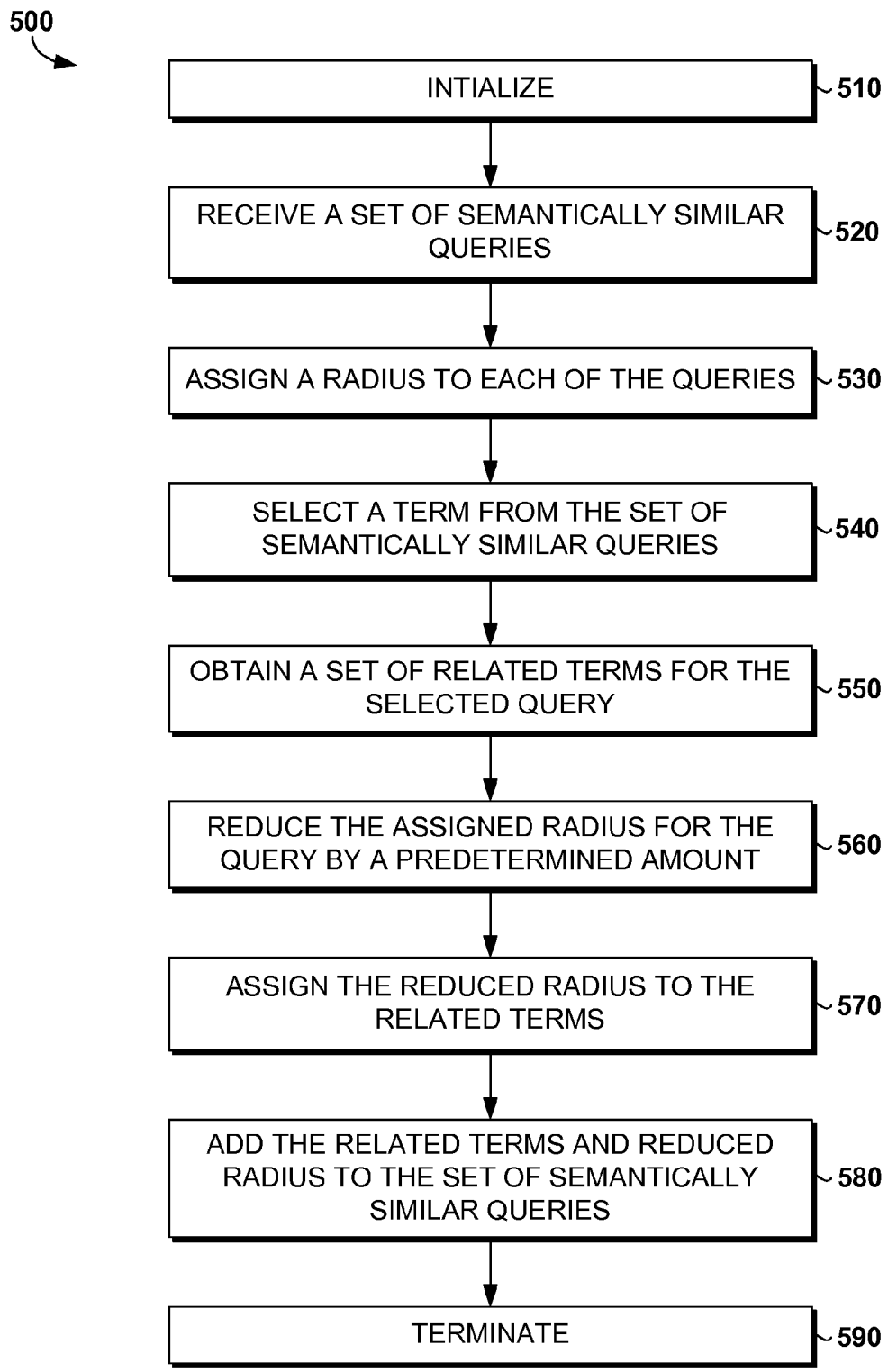
FIG. 5 depicts a logic diagram for an exemplary method for enlarging a set of semantically similar queries, according to an embodiment of the invention.

FIG. 5 depicts a logic diagram for an exemplary method of enlarging a set of semantically similar queries, according to an embodiment of the invention. The method initializes in step 510. In step 520, the computing system receives a set of semantically similar queries. In step 530, a radius is assigned to each of the queries in the set by the computing system. In certain embodiments, the computing system combines one or more queries included in the set of semantically similar queries. A combined radius is assigned to the one or more combined queries. The combined radius is based on the number of queries that are combined. The set of semantically similar queries is modified to include the combined queries and the combined radius. In one embodiment, the combined radius for the combined queries is the radius assigned to the queries individually divided by the number of queries combined.

The computing system, in step 540, selects a query from the set of semantically similar queries. For each query in the set of semantically similar queries, the computing system performs the following. In step 550, the computing system obtains a set of terms related to the selected query. The radius is reduced by a predetermined amount, in step 560. The computing system, in step 570, assigns the related terms to the reduced radius. In turn, the computing system adds the related terms and the reduced radius corresponding to the related terms to the set of semantically similar queries, in step 580. In one embodiment, the number of added related terms is limited by the radius or the reduced radius. The computing system, in some embodiments, checks whether the reduced radius has reached a specific threshold. If the radius has not reached the threshold, additional related terms corresponding to the related terms are added to the set of semantically similar queries. However, the related terms or the additional related terms are ignored by the computing system if the reduced radius has reached the threshold.

The set of semantically similar queries having the related terms are transmitted to a search engine. In an embodiment, the search engine expands user queries based on the set of semantically similar queries and selects search results that match the query and semantically similar queries included in the set of semantically similar queries. The search engine may access the set of semantically similar queries having the related terms to select one or more advertisements related to a search request matching one or more queries or related terms in the set of semantically similar queries. Additionally, the search engine may access the set of semantically similar queries having the related terms to present a search results page having one or more related terms or queries from a set of semantically similar queries that match the received search request. The method terminates in step 590.

In summary, an initial set of semantically similar query terms S={q1, q2, . . . , qn} are expanded to S'. S may include queries from several verticals, like restaurants, foods, technology companies, etc. S' is populated with related searches and auto-suggested terms that are related to the queries in S. In some embodiments, S may include a permutation of some of the elements of S. The terms may be combined to provide randomization, e.g., diversity, to the final set S' as well as extend the initial set S. The combined terms are included in the initial set of S without deviating too much from the semantics of S. For each combined term, a reduced radius is generated.

A queue data structure may store all the queries in S. In addition to the queries, each query is associated with a radius r. The radius r will determine how many suggested terms are allowed back at the queue. Subsequent elements added to the queue are not as closely semantically related to the original elements S, and therefore the computing system penalizes their suggested terms by only taking fewer top elements and adding them back to the queue. Hence, a child element (q_child) derived from an element (q_parent, radius) will be added to the queue as (q_child, radius-k). In some embodiments, k is one.

The initial set S has the highest radius associated with them. The policy is high radius terms in S' related to S should be very close semantically. For instance, the radius for the elements in S can have the value of 5. In other words, for a given query (q1) in S, the top 5 elements from the query suggestion component are considered semantically similar to S. The top 5 elements are added to the queue. But these elements being added to the queue will have a decreased radius compared to their parent elements.

The computing system implements a BFS to perform this continuous search until one of two conditions occurs. Either the computing system finds enough semantically similar queries as defined by the end-user or all the elements in the queue are exhausted.

In pseudo-code the algorithm is as follows:

```
Queue (S, radius)
FinalList { }
While(Queue is not empty AND |Finalist| < Max
defined by the end-user)
{
    (currentQuery, currentRadius) Queue.Dequeue
    FinalList += currentQuery
    if(currentRadius > 0)
    {
        L WebEngineSuggestedQueries(currentQuery)
            queue += (top currentRadius of L,
```

```
            currentRadius-1)
    }
}
Return FinalList
```

Below is an example of the expanded set S'. For instance an initial query list may be S={spaghetti, pasta, macaroni, rice and beans, Fruits and Salads, Foods, Top dishes and recipes, sandwiches, meatballs, corn dishes}

The auto-generated semantically similar query set S' using the above algorithm in order to generate 200 similar terms may create the following list:

S'={spaghetti, pasta, macaroni, rice and beans, fruits and salads, foods, top dishes and recipes, sandwiches, meatballs, corn dishes, sandwiches+corn dishes, foods+rice and beans, top dishes and recipes+foods, sandwiches+fruits and salads, fruits and salads+meatballs, pasta+corn dishes, foods+pasta, fruits and salads+foods, spaghetti clip art, spaghetti pictures, spaghetti warehouse, spaghetti sauce recipe, pasta sauce recipe, types of pasta, list of pasta, barilla pasta, pasta recipes, pasta dishes, macaroni beach, macaroni salad, macaroni grill, macaroni recipes, baked macaroni and cheese recipes, puerto rican rice and beans, dominican rice and beans, mexican rice and beans, pinto beans and rice, red beans and rice, vegetable and fruit salad recipe, fruit and salad diet, fruit and salad company, fruit and salad restaurant, fruit salad and cool whip, food recipes, food fight, food network recipes, indian food recipes, usda food plate, top chef recipes, easy recipes, best recipes, best-rated recipes, best dinner recipes, sandwich recipe, sandwich picture, sandwich king, sandwich maker, sandwich fair 2012, meatball recipe, meatball pizza, meatball sandwich, meatball appetizer recipes, meatballs with grape jelly, ceramic corn dishes, corn on the cob dishes, corn side dish recipes, corn recipes, shawnee corn dishes, top recipes recipe web sites, top 10 favorite recipes, simply soup salad and sandwiches, subway salads and sandwiches, baked spaghetti corn, where to buy corn pasta, italian foods pasta, raw food pasta, bowl of spaghetti clip art, plate of spaghetti clip art, free spaghetti clip art, spaghetti clip art pasta, free spaghetti photos, plate of spaghetti photos, italian spaghetti pictures, spaghetti warehouse coupons, spaghetti warehouse tulsa ok, spaghetti warehouse dayton oh, spaghetti warehouse in dallas, homemade spaghetti sauce recipe, italian spaghetti sauce recipe, authentic spaghetti sauce recipe, best spaghetti sauce recipe, marinara sauce recipe, alfredo sauce recipe, creamy pasta sauce recipes, quick pasta sauces recipes, names of pasta, pictures of pasta, pasta shapes, complete list of pasta shapes, a list of pasta dishes, pasta names, list of pasta varieties, barilla pasta coupon, barilla pasta products, barilla pasta nutrition information, rachel ray pasta recipes, angel hair pasta recipes, homemade pasta recipes, italian pasta recipes, italian pasta dishes, chicken pasta dishes, meatless pasta dishes, vegan pasta dishes, macaroni island resort, mustique beach, seal beach macaroni grill, south beach macaroni and cheese, prize-winning pasta salad recipe, cold macaroni salad recipe, best macaroni salad recipe, award-winning macaroni salad recipe, macaroni grill coupon, macaroni grill recipes, macaroni grill bread, macaroni grill catering, homemade macaroni recipes, baked macaroni recipes, easy macaroni recipes, elbow macaroni recipes, old time baked cheese macaroni, homemade baked macaroni & cheese, paula dean's mac and cheese, best baked mac and cheese, spanish rice and beans recipe, puerto rican red beans recipe, spanish rice and beans, yellow spanish rice and beans, dominican red beans and rice, dominican bean recipe, dominican black beans, dominican style rice, authentic mexican beans and rice, mexican pinto beans and rice, mexican black bean and rice, mexican rice and refried beans, canned pinto beans and rice, spanish pinto beans and rice, vegan pinto beans and rice, new orleans red beans rice, easy red beans rice recipe, cajun red beans rice recipe, louisiana red beans and rice, rachel ray fruit salad recipes, cold fruit salad recipes, vegetable fruit diet recipes}

From the foregoing, it will be seen that embodiments of the invention are well adapted to attain all the ends and objects hereinabove set forth together with other advantages, which are obvious and inherent to the structure. Embodiments of the invention that have been described are intended in all respects to be illustrative rather than restrictive. Alternative embodiments will become apparent to those of ordinary skill in the art to which the invention pertains without departing from its scope. It will be understood that certain features and subcombinations are of utility and may be employed without reference to other features and subcombinations. This is contemplated by and is within the scope of the claims.

The technology claimed is:

1. One or more computer storage memories or devices containing computer executable instructions that, when executed, provide a method to enlarge a set of related queries, the method comprising:
   receiving a set of semantically similar queries;
   assigning a radius to each of the queries in the set; and
   for each query in the set of semantically similar queries performing the following:
      obtaining a set of terms related to the queries;
      reducing the radius by a predetermined amount;
      assigning the related term to the reduced radius; and
      adding the related terms and the reduced radius corresponding to the related terms to the set of semantically similar queries;
      checking whether the reduced radius has reached a specific threshold; and
      adding additional related terms corresponding to the related terms, if the radius has not reached the specific threshold, wherein the specific threshold is a radius size or the specific threshold is a number of related terms desired by the user.

2. The one or more computer storage memories or devices of claim 1, wherein the number of added related terms is limited by the radius or the reduced radius.

3. The one or more computer storage memories or devices of claim 1, further comprising:
   providing the set of semantically similar queries having the related terms to a search engine.

4. The one or more computer storage memories or devices of claim 3, wherein the search engine expands user queries based on the set of semantically similar queries and selects search results that match the query and semantically similar queries included in the set of semantically similar queries.

5. The one or more computer storage memories or devices of claim 1, further comprising:
   combining one or more queries included in the set of semantically similar queries.

6. The one or more computer storage memories or devices of claim 5, further comprising:
   assigning a combined radius to the one or more combined queries, wherein the combined radius is based on the number of queries that are combined.

7. The one or more computer storage memories or devices of claim 6, further comprising:
   modifying the set of semantically similar queries to include the combined queries and the combined radius.

8. The one or more computer storage memories or devices of claim 7, wherein the combined radius for the combined queries is the radius assigned to the queries individually divided by number of queries combined.

9. The one or more computer storage memories or devices of claim 1, wherein the related terms or the additional related terms are ignored if the reduced radius has reached the specific threshold.

10. The one or more computer storage memories or devices of claim 1, wherein a search engine accesses the set of semantically similar queries having the related terms to select one or more advertisements related to a search request matching one or more queries or related terms in the set of semantically similar queries.

11. The one or more computer storage memories or devices of claim 1, wherein a search engine accesses the set of semantically similar queries having the related terms to present a search results page having one or more related terms or queries from the set of semantically similar queries that match the received search request.

12. A computer-implemented method to enlarge a set of related queries the computer-implement method, the computer-implemented method comprising:
   receiving, by a computer processor, a set of semantically similar queries;
   assigning, by the computer processor, a radius to each of the queries in the set; and
   for each query in the set of semantically similar queries performing the following by the computer processor:
      obtaining a set of terms related to the queries;
      reducing the radius by a predetermined amount;
      assigning the related term to the reduced radius; and
      adding the related terms and the reduced radius corresponding to the related terms to the set of semantically similar queries;
      checking whether the reduced radius has reached a specific threshold; and
      adding additional related terms corresponding to the related terms, if the radius has not reached the specific threshold, wherein the specific threshold is a radius size or the specific threshold is a number of related terms desired by the user.

13. The computer-implemented method of claim 12, wherein the number of added related terms is limited by the radius or the reduced radius.

14. The computer-implemented method of claim 12, further comprising:
   providing the set of semantically similar queries having the related terms to a search engine.

15. The computer-implemented method of claim 14, wherein the search engine expands user queries based on the set of semantically similar queries and selects search results that match the query and semantically similar queries included in the set of semantically similar queries.

16. The computer-implemented method of claim 12, further comprising:
   combining one or more queries included in the set of semantically similar queries.

17. The computer-implemented method of claim 16, further comprising:
   assigning a combined radius to the one or more combined queries, wherein the combined radius is based on the number of queries that are combined; and
   modifying the set of semantically similar queries to include the combined queries and the combined radius.

18. The computer-implemented method of claim 17, wherein the combined radius for the combined queries is the radius assigned to the queries individually divided by number of queries combined.

19. The computer-implemented method of claim 12, wherein the related terms or the additional related terms are ignored if the reduced radius has reached the specific threshold.

20. The computer-implemented method of claim 12, wherein a search engine accesses the set of semantically similar queries having the related terms to perform at least one of the following:
- select one or more advertisements related to a search request matching one or more queries or related terms in the set of semantically similar queries; or
- to present a search results page having one or more related terms or queries from the set of semantically similar queries that match the received search request.

21. A computer system for enlarging a set of related queries, the computer system having
- memories and processors such that at least one or more processors are configured to perform the following:
- receive, by at least one or more computer processors, a set of semantically similar queries;
- assign, by at least one or more computer processors, a radius to each of the queries in the set; and
- for each query in the set of semantically similar queries performing the following by the at least one or more computer processors:
- obtain a set of terms related to the queries;
- reduce the radius by a predetermined amount;
- assign the related term to the reduced radius; and
- add the related terms and the reduced radius corresponding to the related terms to the set of semantically similar queries;
- check whether the reduced radius has reached a specific threshold; and
- add additional related terms corresponding to the related terms, if the radius has not reached the specific threshold, wherein the specific threshold is a radius size or the specific threshold is a number of related terms desired by the user.

* * * * *